US006626275B2

United States Patent
Lee

(10) Patent No.: US 6,626,275 B2
(45) Date of Patent: Sep. 30, 2003

(54) APPARATUS AND METHODS FOR CONNECTING A LAPTOP TO AN ON-BOARD COMMUNICATIONS NETWORK

(76) Inventor: Donald B. Lee, 17132 10$^{th}$ NE., Shoreline, WA (US) 98155

( * ) Notice: Subject to any disclaimer, the term of this patent is extended or adjusted under 35 U.S.C. 154(b) by 0 days.

(21) Appl. No.: 09/947,011

(22) Filed: Sep. 5, 2001

(65) Prior Publication Data

US 2003/0042097 A1 Mar. 6, 2003

(51) Int. Cl.$^7$ .............................................. H02G 11/00
(52) U.S. Cl. ................................................... 191/12 R
(58) Field of Search ......................... 191/12 R, 12.2 R, 191/12.4

(56) References Cited

U.S. PATENT DOCUMENTS

| | | | | |
|---|---|---|---|---|
| 6,016,016 A | | 1/2000 | Starke et al. | 307/9.1 |
| 6,176,358 B1 | * | 1/2001 | Hsin | 191/12.2 R |
| 6,249,913 B1 | | 6/2001 | Galipeau et al. | 725/76 |
| 6,282,289 B1 | * | 8/2001 | James et al. | 379/446 |
| 6,315,231 B1 | * | 11/2001 | Liaom | 191/12.2 A |
| 6,324,285 B1 | * | 11/2001 | Dowsett et al. | 242/400 |

FOREIGN PATENT DOCUMENTS

| | | | |
|---|---|---|---|
| EP | 0 926 065 A2 | 12/1998 | B64D/11/00 |
| EP | 0 926 065 A3 | 12/1998 | B64D/11/00 |
| WO | WO 95/29552 | 11/1995 | H04M/11/00 |
| WO | WO 00/14987 | 3/2000 | H04Q/7/38 |

OTHER PUBLICATIONS http://www.cordmgmt.com/ife.html, TELEFONIX, Inc., 1998, 1 page.
Kelly, E., *Spring an airborne web*, Flight International, Reed Business Information, 158:48–50, (2000).
Michels, J., *The last great frontier*, Techway, (2001) http://techway.washtech.com/news/2–6/moretech/8379–1.html, Retrieved Oct. 31, 2002.
Spiers, D., *You've got airmail*, The Conference Spy, (2001), www.business2.com/articles/web/0,1653,12422,00.html, Retrieved Oct. 31, 2002.
Meloan, S., *Java technology takes the sky* (2000), http://java.sun.com/features/200/11/air.html, Retrieved Oct. 31, 2002.

* cited by examiner

Primary Examiner—S. Joseph Morano
Assistant Examiner—Robert J. McCarry, Jr.

(57) ABSTRACT

An apparatus for connecting a laptop computer to a communications network for access by a seated user in a mobile platform. A cord reel assembly within the seat headrest includes a user interface retractable through the headrest and a user connector for connecting the laptop thereto. A connector to the network is situated below the seat. A seat interface extends from the cord reel assembly through the seat to the network connector. The apparatus provides an ethernet connection between the laptop and the network. The apparatus allows each seated passenger having a laptop to connect to an on-board communications network. The apparatus is for the most part hidden from view beneath the passenger seat.

12 Claims, 2 Drawing Sheets

APPARATUS AND METHODS FOR CONNECTING A LAPTOP TO AN ON-BOARD COMMUNICATIONS NETWORK

FIELD OF THE INVENTION

The present invention relates generally to apparatus for connecting laptop computers to communication networks and, more particularly, to an apparatus for connecting a laptop computer to a communications network for use by a passenger seated on board a mobile platform.

BACKGROUND OF THE INVENTION

Broadband data and video services have not been widely available to users on mobile platforms such as aircraft, boats, trains, and automobiles. Mobile network systems have traditionally been limited in bandwidth and link capacity, making it prohibitively expensive and/or unacceptably slow to distribute such services to all passengers on a mobile platform.

A system for supplying television and data services to mobile platforms, described in co-pending U.S. patent application Ser. No. 09/639,912, provides bi-directional data transfer via satellite communications link between a ground-based control segment and a mobile RF transceiver system carried on each mobile platform. Each user on each mobile platform is able to interface with an on-board server by using, for example, a laptop computer. Each user can independently request and obtain Internet access, company intranet access and live television programming.

It would be desirable to provide each seated passenger with a connection to such a network. It also would be desirable for such a connection to be easily accessible and easily stowable when not in use.

SUMMARY OF THE INVENTION

In one preferred form, the present invention provides an apparatus for connecting a laptop computer to a communications network for access by a user in a seat on board a mobile platform. The apparatus includes a cord reel assembly mounted within a headrest of the seat and including a reel, a reel housing and a user interface that is selectively drawn outward and retracted inward relative to the housing through a top of the headrest. The user interface includes a user connector configured for connection of a laptop thereto. The apparatus also includes a connector to the network situated below the seat, and a seat interface extending from the cord reel assembly through at least a portion of the seat, the seat interface being electrically connected to the network connector. The apparatus is configured to provide an ethernet connection between the laptop and the network through the cord reel assembly, seat interface and connector to the network.

The above apparatus allows each seated passenger to use his or her own laptop computer to connect to an on-board communications network. The passenger has easy access to the connection provided by the apparatus, which is for the most part hidden from view beneath the passenger seat.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
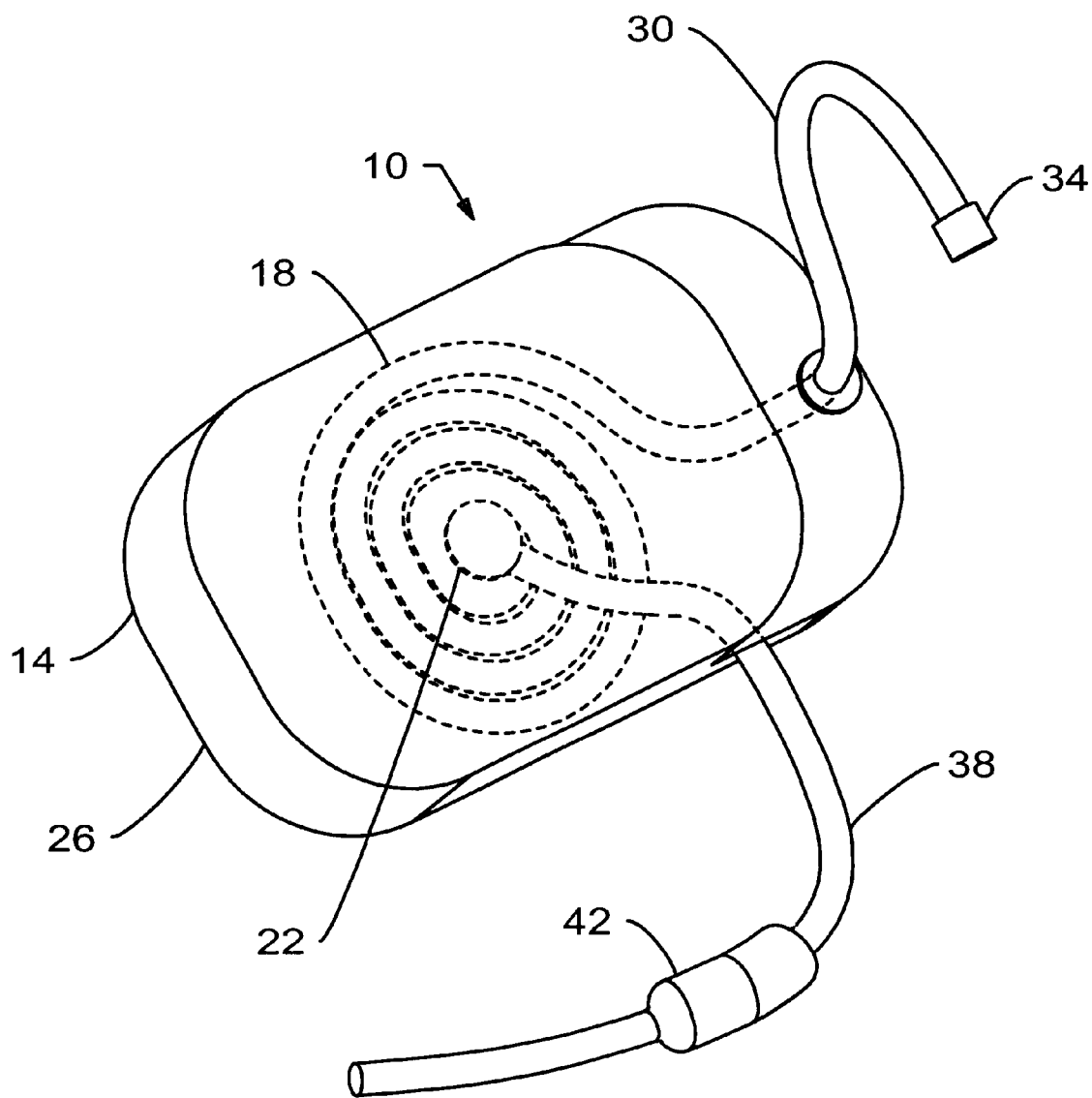
FIG. 1 is a view in perspective of an apparatus for connecting a laptop computer to a communications network for access by a user in a seat on board a mobile platform.

The following description of the preferred embodiments is merely exemplary in nature and is in no way intended to limit the invention, its application, or uses. An apparatus for connecting a laptop computer to a communications network for access by a user in a seat on board a mobile platform, for example, a passenger seated in an aircraft, is indicated generally by reference number 10 in FIG. 1. Such platforms could include cruise ships or any other moving vehicle as well as aircraft. Thus the description of the mobile platform as an aircraft herein, and the reference to the mobile platform as an aircraft throughout the following description, should not be construed as limiting the applicability of the apparatus 10 and/or the present invention to only aircraft.

Referring again to FIG. 1, a cord reel assembly 14 includes an electrically shielded cord 18 wrapped around a reel 22 inside a reel housing 26. The cord reel assembly 14 is configured for mounting within a headrest of a passenger seat as further described below. A user interface end 30 of the cord 18 can be selectively drawn outward and retracted inward relative to the reel 22. A user connector 34 electrically connected to the user interface 30 is configured for connection of a laptop computer thereto. The user connector 34 is, for example, a RJ-45 connector.

A seat interface end 38 of the cord 18 extends from the cord reel assembly 14 and is electrically connected to a connector 42. A communications network, for example, a network implemented as described in co-pending U.S. patent application Ser. No. 09/639,912, the disclosure of which is incorporated herein by reference in its entirety, is accessible via the connector 42. The connector 42 is situated below a passenger seat (not shown in FIG. 1), for example, in a junction box (not shown in FIG. 1) below a floor panel of the aircraft.

Figure 2:
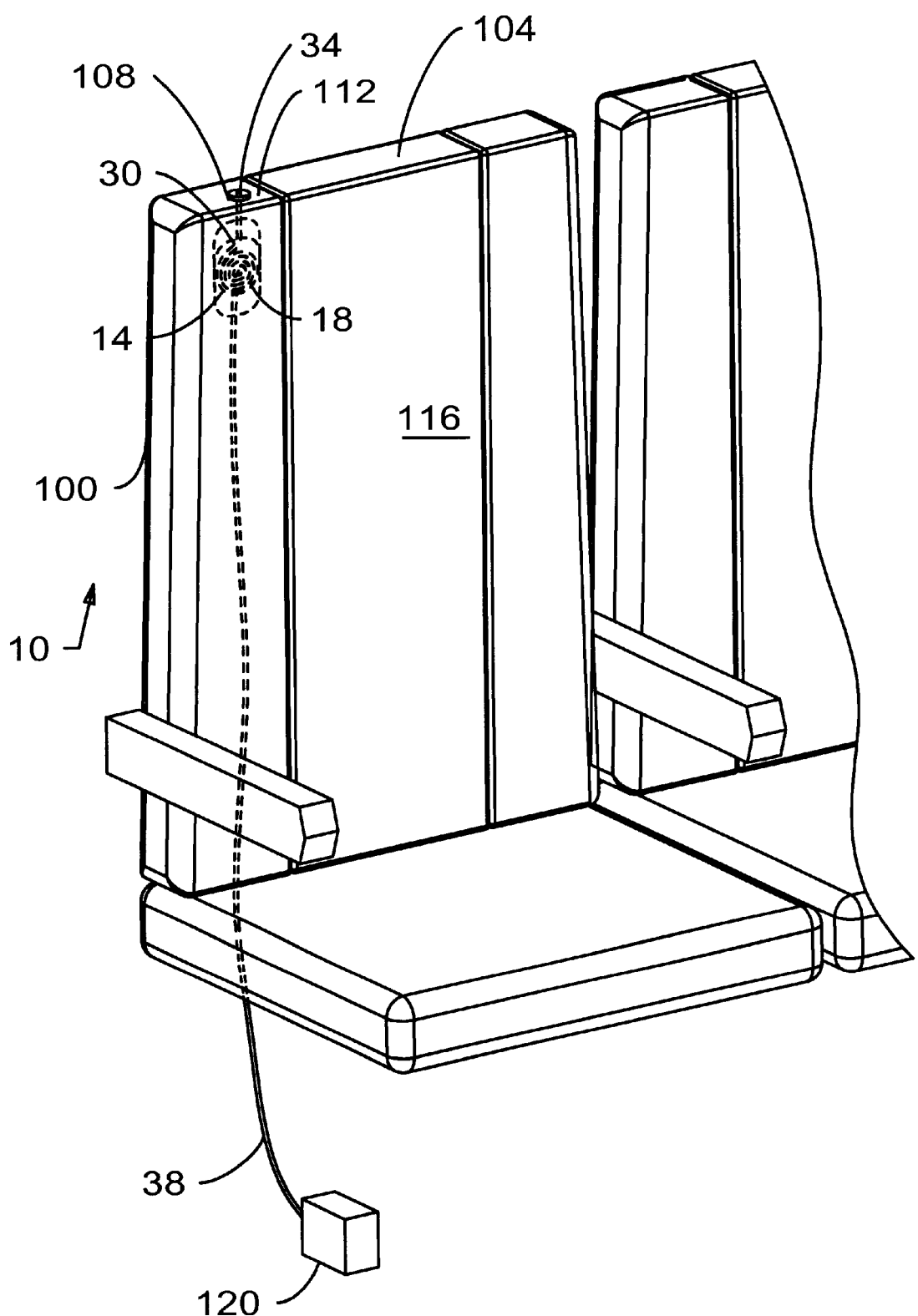
FIG. 2 is a view in perspective of a seat on a mobile platform, in which a network connection for a laptop computer is provided according to one embodiment of the present invention.

FIG. 2 is a view in perspective of a seat 100 on an aircraft in which a network connection for a laptop computer is provided according to one embodiment of the present invention. As shown in FIG. 2, the user interface end 30 of the cord 18 is fully retracted inward relative to the cord reel assembly 14, which is mounted inside the headrest 104 of the seat 100. When the user interface 30 is fully retracted, the user connector 34 preferably lies substantially flush with the headrest 104 and thus is stowed out of the way of passengers when not in use. The user interface 30 extends and retracts through a stabilizing member, for example, a cover plate 108, located on top of the headrest 104.

The seat interface end 38 of the cord 18 extends from the cord reel assembly 14 through at least a portion of the seat 100, for example, underneath a cover 116 of the seat, and into a junction box 120 for electrical connection with the network connector 42 (shown in FIG. 1). Thus the apparatus 10 is configured to provide an ethernet connection between the passenger's laptop computer and the network through the cord reel assembly 14, the seat interface 30 and the network connector 42.

When a passenger wishes to connect his or her laptop to the network, he or she pulls the connector 34 outward from the top 112 of the headrest 104 and connects the connector 34 to the laptop. When the passenger wishes to disconnect the laptop from the network, he or she disconnects the connector 34 and releases it for retraction into the housing 26 in the headrest 104. The cover plate 108 keeps the connector 34 from retracting to an unreachable position within the top of the headrest 104 and stabilizes the user interface 30 relative to the headrest 104 as the cord 18 is pulled and/or retracted.

The above-described apparatus allows an airline to provide a network connection at each passenger seat so that passengers may use their laptop computers to access a communications network during flight. The passenger connector is easily accessible on the top of the passenger seat and is easily retracted into the headrest after being used. Although the apparatus is for the most part hidden from view, it nevertheless is easily installed and maintained.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for connecting a laptop computer to a communications network for access by a user in a seat on board a mobile platform, the apparatus comprising:
    a cord reel assembly mounted within a headrest of the seat and comprising a reel, a reel housing and a user interface that is selectively drawn outward and retracted inward relative to the housing through a top of the headrest, the user interface comprising a user connector configured for connection of a laptop thereto;
    a connector to the network situated below the seat; and
    a seat interface extending from the cord reel assembly through at least a portion of the seat, the seat interface being electrically connected to the network connector.

2. The apparatus of claim 1 configured to provide an ethernet connection between the laptop and the network through the cord reel assembly, seat interface and connector to the network.

3. The apparatus of claim 1 further comprising a stabilizing member configured to stabilize the user interface relative to the top of the headrest during the selective drawing outward and retracting inward.

4. The apparatus of claim 3 wherein the stabilizing member comprises a cover plate located on top of the headrest.

5. The apparatus of claim 1 wherein the seat interface is electrically shielded.

6. An apparatus for connecting a laptop computer to a communications network for access by a user in a seat on board a mobile platform, the apparatus comprising:
    a cord reel assembly mounted within a headrest of the seat and comprising a reel, a reel housing and a user interface that is selectively drawn outward and retracted inward relative to the housing through a top of the headrest, the user interface comprising a user connector configured for connection of a laptop thereto;
    a connector to the network situated below the seat; and
    a seat interface extending from the cord reel assembly through at least a portion of the seat, the seat interface being electrically connected to the network connector, the apparatus being configured to provide an ethernet connection between the laptop and the network through the cord reel assembly, seat interface and connector to the network.

7. The apparatus of claim 6 further comprising a stabilizing member configured to stabilize the user interface relative to the top of the headrest during the selective drawing outward and retracting inward.

8. The apparatus of claim 7 wherein the stabilizing member comprises a cover plate located on top of the headrest.

9. A method for providing a connection, for a laptop computer of a passenger seated on board a mobile platform, to a communications network, the network being accessible via a network connector situated below the passenger seat, said method comprising the steps of:
    mounting a cord reel assembly within a headrest of the seat such that a passenger interface end of a cord of the assembly can be selectively drawn outward and retracted inward relative to the reel from atop the headrest, the cord reel assembly being configured to conduct signals between the passenger interface end and a seat interface end of the cord;
    electrically connecting, to the passenger interface end, a user connector configured to connect with the laptop;
    extending the seat interface end of the cord through at least a portion of the seat to meet with the network connector; and
    electrically connecting the seat interface end with the network connector.

10. The method of claim 9 further comprising the step of stabilizing the selective drawing outward and retraction inward of the passenger interface end relative to the top of the headrest using a cover plate.

11. The method of claim 9 further comprising the step of electrically shielding the cord reel assembly.

12. The method of claim 9 further comprising the step of configuring the cord reel assembly to provide an Ethernet connection to the network.

* * * * *